United States Patent [19]
Wu et al.

[11] Patent Number: 5,825,859
[45] Date of Patent: Oct. 20, 1998

[54] DISPLAY CONTROL DEVICE ALLOWING INFORMATION TRANSMISSION TO BOTH DISPLAY AND DIALER

[75] Inventors: Chi-Yung Wu; Rong-Tyan Wu, both of Hsinchu, Taiwan

[73] Assignee: Holtek Micro Electronics, Inc., Taiwan

[21] Appl. No.: 508,139

[22] Filed: Jul. 27, 1995

Related U.S. Application Data

[63] Continuation-in-part of Ser. No. 359,714, Dec. 20, 1994, abandoned, which is a continuation of Ser. No. 214,079, Mar. 16, 1994, abandoned, which is a continuation of Ser. No. 929,864, Aug. 17, 1992, abandoned.

[51] Int. Cl.[6] ............................ H04M 15/00; H04M 1/00
[52] U.S. Cl. ......................... 379/131; 379/130; 379/141; 379/354; 379/355
[58] Field of Search .................................... 379/130, 131, 379/140, 141, 142, 354, 355

[56] References Cited

U.S. PATENT DOCUMENTS

| | | | |
|---|---|---|---|
| 4,475,013 | 10/1984 | Lee | 379/355 |
| 4,585,904 | 4/1986 | Mincone | 379/131 |
| 4,656,657 | 4/1987 | Hunsicker | 379/140 |
| 4,751,728 | 6/1988 | Treat | 379/131 |
| 4,924,496 | 5/1990 | Figa | 379/142 |
| 4,982,423 | 1/1991 | Muroi | 379/354 |

*Primary Examiner*—Vijay Shankar
*Attorney, Agent, or Firm*—Donald C. Casey, Esq.

[57] ABSTRACT

The present invention is related to a display control device adapted to be used in a communication apparatus providing an information for transmitting the information to a display and transmitting the information to a second device when the information is required by the second device, which includes a buffer device storing therein the information, a decoder electrically connected to the buffer device for decoding the information stored in the buffer device and outputting the decoded information to the display, a bidirectional transmission device electrically connected to the buffer device for transmitting the information to the display and transmitting the information to the second device when the information is required by the second device, and a controller electrically connected to the bidirectional transmission device for controlling a transmission between the bidirectional transmission device and the second device. The present invention receives information and transmits received information to a display and/or another circuit through a simple structure.

9 Claims, 2 Drawing Sheets

… (5,825,859)

DISPLAY CONTROL DEVICE ALLOWING INFORMATION TRANSMISSION TO BOTH DISPLAY AND DIALER

FIELD OF THE INVENTION

The present invention is a continuation-in-part application of U.S. Ser. No. 08/359,714 filed on Dec. 20, 1994, which is a continuation application of U.S. Ser. No. 08/214,079 filed on Mar. 16, 1994, which is a continuation application of U.S. Ser. No. 07/929,864 filed on Aug. 17, 1992. The present invention is related to a display control device, and more particularly to a display control device capable of not only receiving therein but also transmitting therefrom display information.

BACKGROUND OF THE INVENTION

Conventional communication apparatus, such as a telephone, commonly use a microprocessor with built-in programs to control the functions of a display. Because the central processing unit (CPU) of the microprocessor needs tens of pins for communication, a great number of lines are accordingly needed for the connection between the microprocessor and the display. Therefore, the circuitry is very complicated and renders the circuit unstable.

In the preceding applications of the present invention, a multi-function dialer display is disclosed. As shown in FIG. 1, a preferred embodiment of the multi-function dialer display includes a dialer 1, a multi-function LCD display driver 2 and a LCD display 3. The multi-function LCD display driver 2 further includes a dialing number receiver 21 electrically connected to the dialer 1 for receiving data and clock signals from the dialer 1, a dialing detector 22 monitoring the current ON/OFF state of the hook switch, and a display-mode selector 23 electrically connected to the dialing number receiver 21 for determining which kind of information is to be displayed. The data transmitted from the dialer 1 to the multi-function LCD display driver 2 and further shown on the LCD display 3 include information of timer, current clock, dialing number, receiver's name and hook operation state, or an optional combination thereof.

Such a multi-function dialer display, however, has a disadvantage of permitting only unidirectional transmission. Namely, the multi-function LCD display driver 2 can receive data from the dialer 1 and transmit it to the LCD display 3 but it cannot feedback the data to the dialer 1 or output the data to another circuit. The usages and the functions of the communication apparatus are thus limited.

SUMMARY OF THE INVENTION

An object of the present invention is to provide a display control device which receives various kinds of information and has the information shown on a display through a simple circuit structure.

Another object of the present invention is to provide a display control device which receives information and transmits received information to a display and/or another circuit through a simple circuit structure.

In accordance with the present invention, a display control device adapted to be used in a communication apparatus providing an information for transmitting the information to a display and transmitting the information to a second device when the information is required by the second device includes a buffer device storing therein the information, a decoder electrically connected to the buffer device for decoding the information stored in the buffer device and outputting the decoded information to the display, a bidirectional transmission device electrically connected to the buffer device for transmitting the information to the display and transmitting the information to the second device when the information is required by the second device, and a controller electrically connected to the bidirectional transmission device for controlling a transmission between the bidirectional transmission device and the second device.

Preferably, the buffer device is a shift register, and the shift register can utilize a clock of the communication apparatus as a clock thereof.

In accordance with another aspect of the present invention, the information includes a data selected from timer, clock, number, name and operation state information, and a combination thereof The buffer device is electrically connected to a data generator of the communication apparatus for receiving therein the above data from the data generator.

In accordance with another aspect of the present invention, the information further includes a control code inputted to the controller for determining whether the data is to be transmitted from the data generator to the second device through the bidirectional transmission device and which kind of data is to be transmitted.

Illustratively, the second device to which the information is transmitted is a dialer or a microprocessor.

Illustratively, the display to which the information is transmitted is a LCD display or a LED display.

Illustratively, the communication apparatus in which the display control device is used is a telephone or a Caller ID system.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
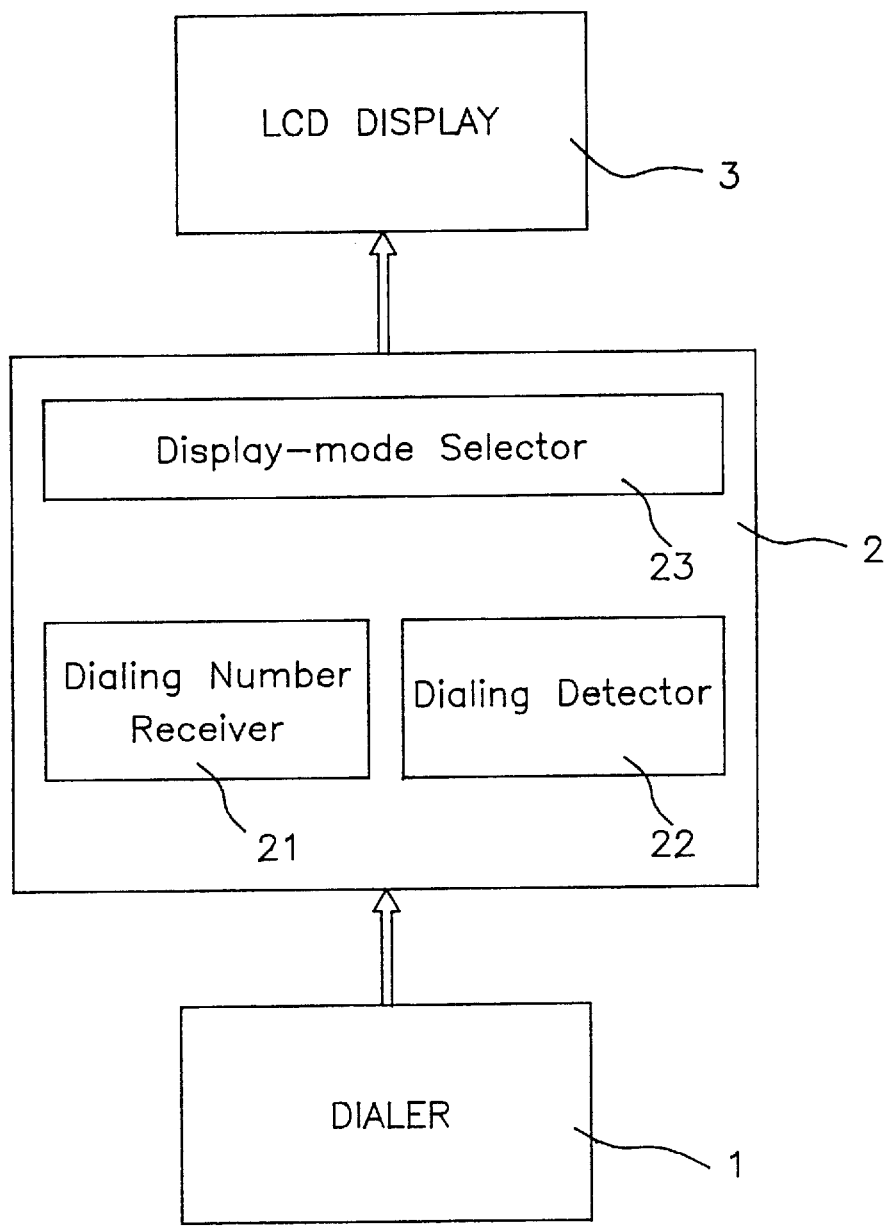
FIG. 1 is a schematic block diagram showing a communication apparatus using a display control device.
Figure 2:
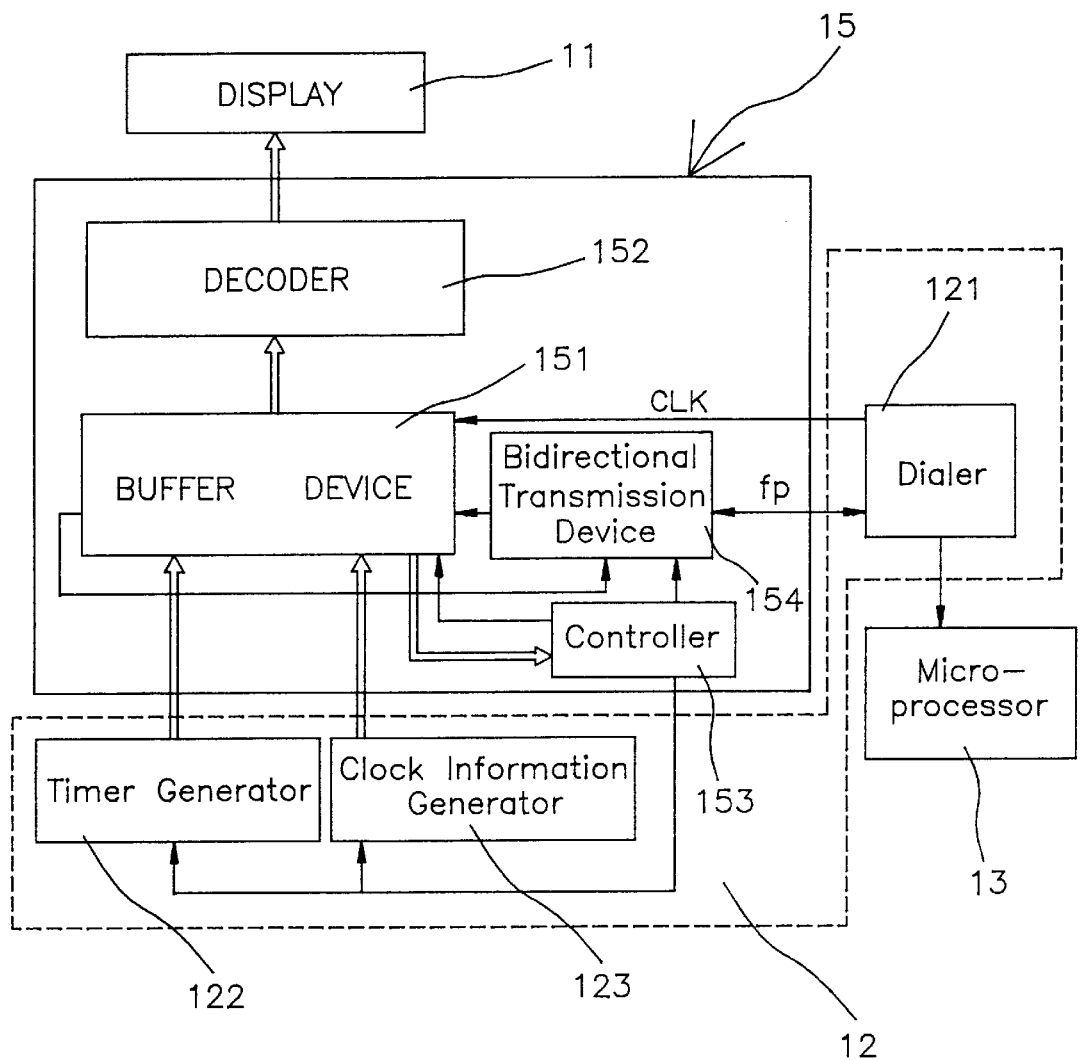
FIG. 2 is a schematic block diagram showing a communication apparatus using a preferred embodiment of a display control device according to the present invention.

Please refer to FIG. 2 which is a schematic block diagram showing a communication apparatus using a preferred embodiment of a display control device according to the present invention. As shown in FIG. 2, the control device 15 according to the present invention is used in a communication apparatus, and the communication apparatus further includes a display 11, and a data generator 12 which for example may be a dialer 121 for providing a dialing number and a receiver's name, a timer generator 122 for providing the timing information of a call, a clock information generator 123 for providing clock and date information, etc. The control device shown in FIG. 2 includes a buffer device 151, a decoder 152, a bidirectional transmission device 154, and a controller 153. The numeral reference 13 represents a circuit which may need the information stored in the buffer device 151 of the control device 15, for example a microprocessor. Of course, the circuit can also be the dialer 121 providing some of the information.

In the preferred embodiment of the present invention, the communication apparatus 10 is a Caller ID system; the buffer device 151 is a shift register; the display 11 can be a LCD display; and the circuit 13 is a microprocessor electrically connected to the dialer 121. Of course, the communication apparatus 10 can also be a telephone, and the display 11 can also be a LED display.

First of all, data selected from timer, clock, number, name and operation state information, and a combination thereof are transmitted from the data generator 12 to the shift register 151. In the case of unidirectional transmission, the shift register 151 outputs the data stored therein to the decoder 152 for being decoded and further transmitted to the display 11. In the case that the data is required by the microprocessor 13, a feedback path fp between the bidirectional transmission device 154 and the dialer 121 is first conducted, and then the data stored in the shift register 151 are transmitted to the dialer 121 through the feedback path fp and further to the microprocessor 13. The transmission between the bidirectional transmission device 154 and the dialer 121 is controlled by the controller 153 by using a control code from the data generator 12. In other words, the controller 153 determines whether the data is to be transmitted from the data generator 12 to the dialer 121 through the bidirectional transmission device 154, i.e. whether the feedback path fp should be conducted, and which kind of data is to be transmitted according to the control code.

In the preferred embodiment of the present invention, the clock of the shift register 151 is provided by the dialer 121. The dialer 121 outputs a one-bit data to the shift register 151 during each pulse of the clock signal. After the feedback path is conducted, the pulse number of the clock signal complies with the operation stages of the flip-flop in the shift register. According to the features of such a shift register, the shift register can transmit data stored therein to the display and also reserve the complete data for further feedback operation.

To sum up, the present invention provides a display control circuit which is capable of not only receiving therein but also transmitting therefrom display information to the display and/or another circuit. The applications of the communication apparatus are therefore enlarged. In addition, the clock of the buffer device can be provided by another device of the communication apparatus so that no additional synchronizing circuit is needed and the cost can be economized. Furthermore, the circuit structure of the present invention is very simple, and it is not necessary for the present invention to use a great number of lines to connect to the display as the conventional one does. On the other hand, the display used with the present invention can be various types of display, such as a LED or a LCD display. The present invention can be used not only together with a communication apparatus with a dialer and/or a microprocessor but also independently in any system displaying for example timing, name information, etc., such as a Caller ID system of a telephone company.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display control device adapted to be used in a communication apparatus and electrically connection between a data generator including a timer generator, a clock information generator and a dialer, and a display of said communication apparatus for driving said display to show information outputted from said data generator and transmitting said information to said dialer control device comprising:

a buffer device for receiving said information from said data generator and storing therein said information;

a decoder electrically connected to said buffer device for decoding said information stored in said buffer device and outputting said decoded information to said display to be shown;

a bidirectional transmission device electrically connected between said buffer device and said dialer for transmitting a part of said information outputted from said dialer to said buffer device therethrough, and transmitting said information from said buffer device to said dialer when necessary; and a controller electrically connected to said bidirectional transmission device and said buffer device for controlling a transmission device to said dialer.

2. A display control device according to claim 1 wherein said buffer device is a shift register.

3. A display control device according to claim 2 wherein said shift register utilizes a clock of said communication apparatus as a clock thereof.

4. A display control device according to claim 1 wherein said information includes a data selected from a group consisting of timer, clock, date, number, name and operation state information, and a combination thereof.

5. A display control device according to claim 1 wherein said information further includes a control code inputted to said controller for determining whether said transmission of said information from said dialer to said bidirectional transmission device is to be conducted and what part of said information is to be transmitted.

6. A display control device according to claim 1 wherein said display to which said information is transmitted is a LCD display.

7. A display control device according to claim 1 wherein said display to which said information is transmitted is a LED display.

8. A display control device according to claim 1 wherein said communication apparatus in which said display control device is used is a telephone.

9. A display control device according to claim 1 wherein said communication apparatus in which said display control device is used is a Caller ID system.

* * * * *